Aug. 18, 1959   H. E. COOK   2,900,099
CARGO LIFT FOR A TRUCK BODY
Filed Oct. 7, 1954   3 Sheets-Sheet 1
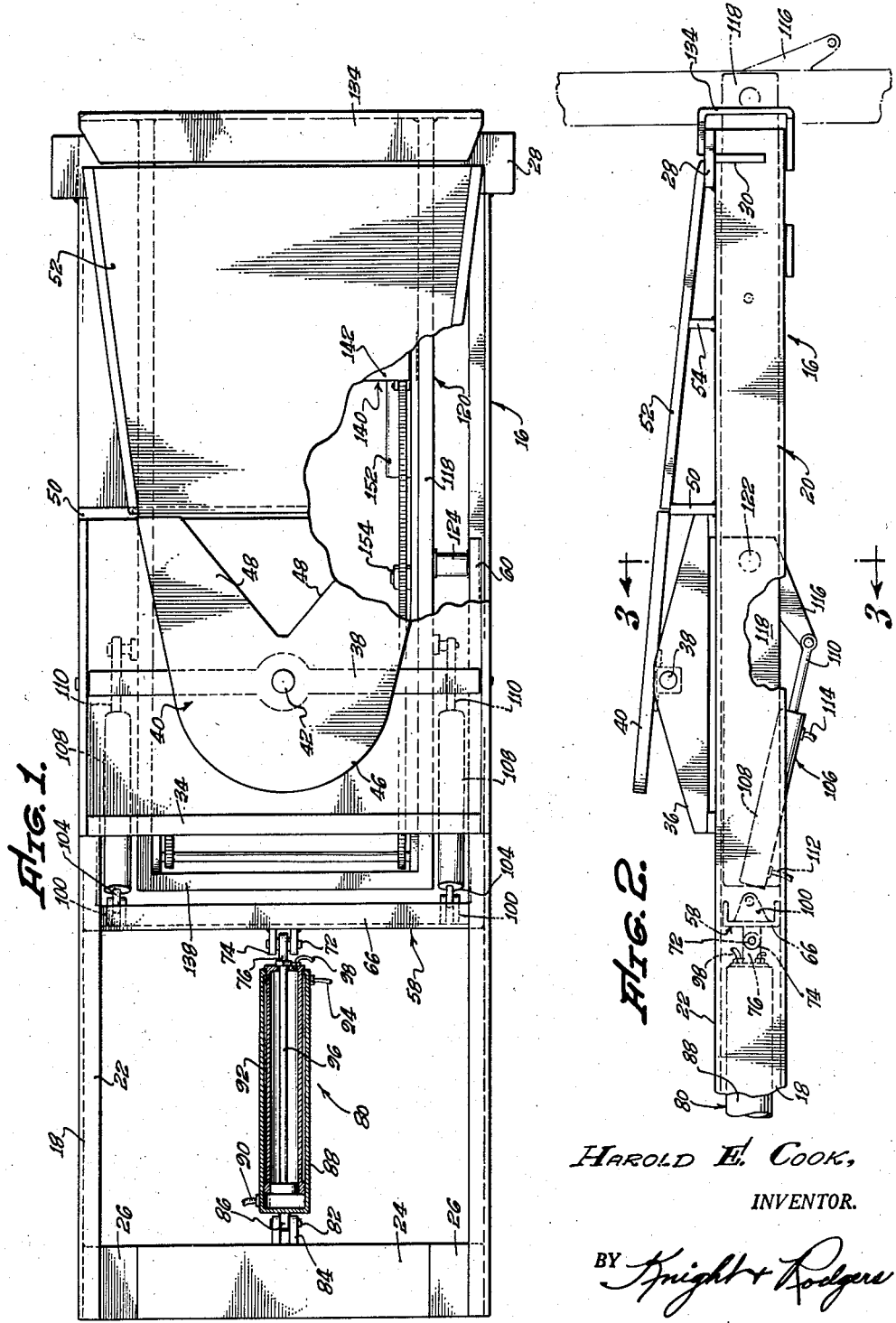
HAROLD E. COOK,
INVENTOR.
BY Knight + Rodgers
ATTORNEYS.

Aug. 18, 1959 H. E. COOK 2,900,099
CARGO LIFT FOR A TRUCK BODY
Filed Oct. 7, 1954 3 Sheets-Sheet 2
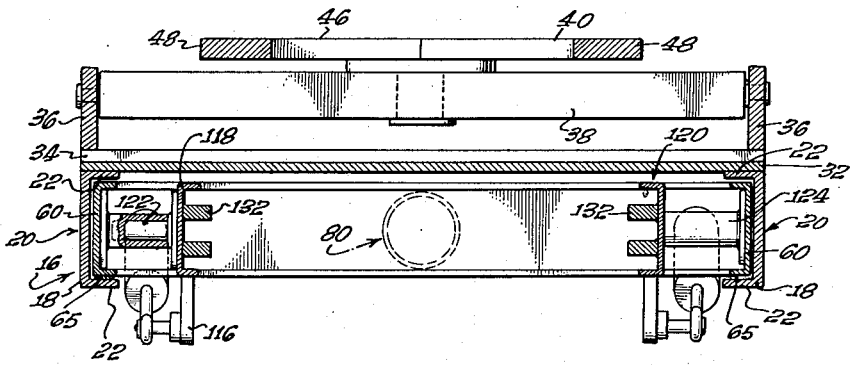
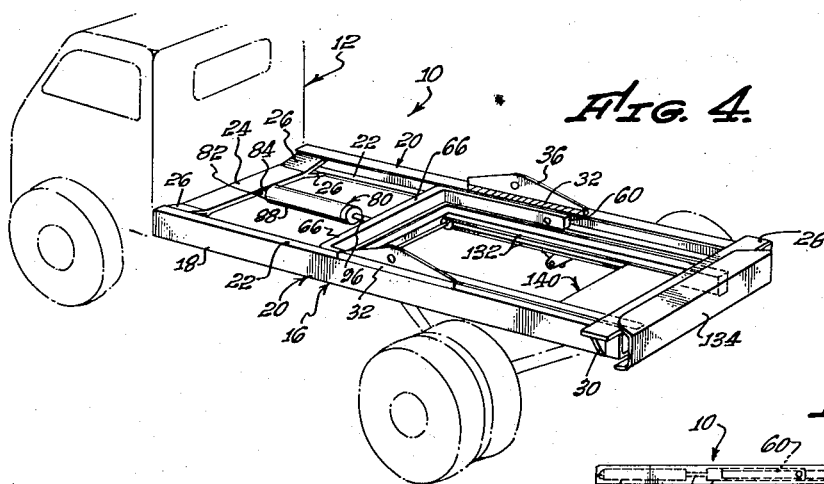
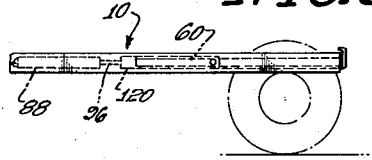
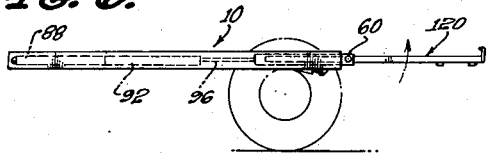
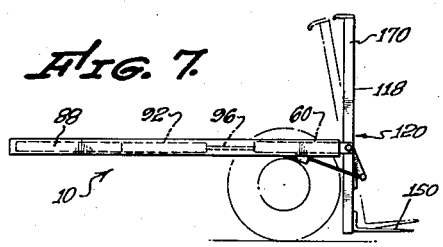
HAROLD E. COOK,
INVENTOR.
BY Knight & Rodgers
ATTORNEYS.

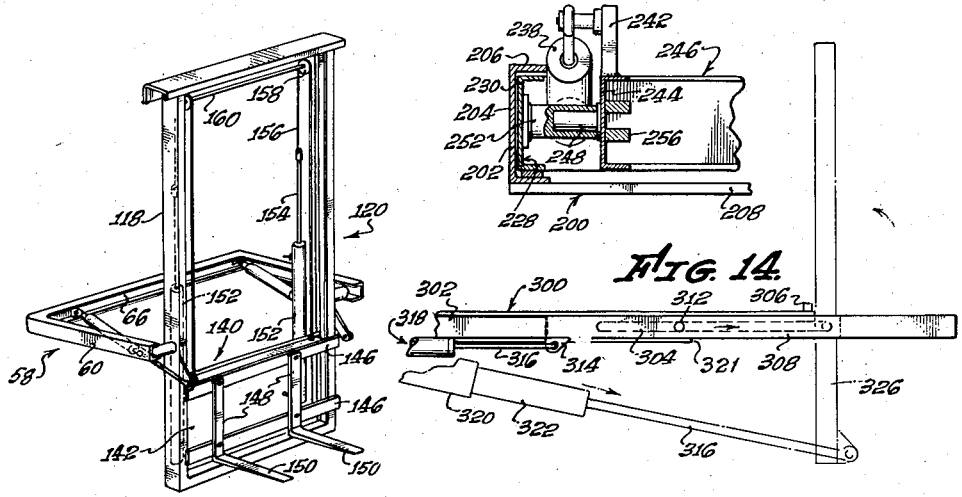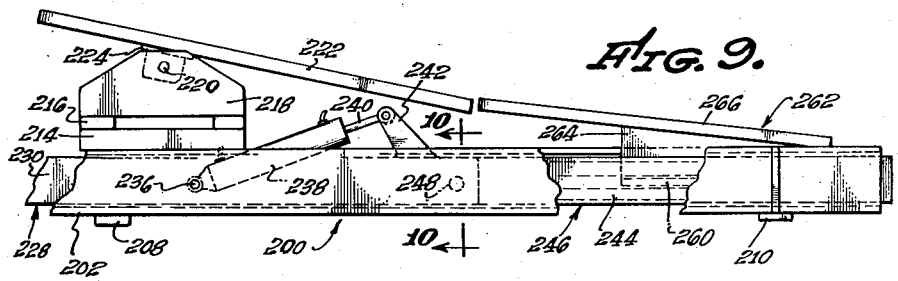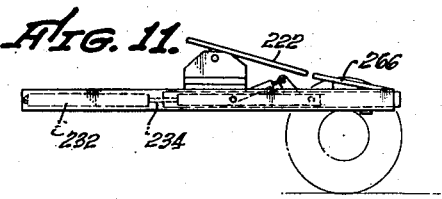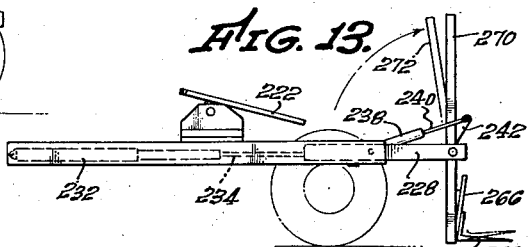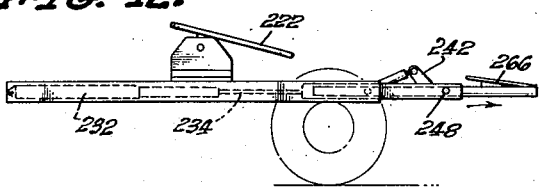
Harold E. Cook,
INVENTOR.

United States Patent Office 2,900,099
Patented Aug. 18, 1959

2,900,099

CARGO LIFT FOR A TRUCK BODY

Harold E. Cook, South Gate, Calif., assignor of one-half to Raymond G. Schneyer, Whittier, Calif.

Application October 7, 1954, Serial No. 460,805

10 Claims. (Cl. 214—674)

This invention relates to apparatus for loading and unloading cargoes and more particularly to apparatus for utilization with a truck or tractor to provide for the loading and unloading of cargoes. The apparatus is especially designed and therefore described as carried permanently by the tractor under the fifth wheel of the tractor for easy availability and for quick and efficient conversion of the tractor into a lift truck.

It is well known that a motor vehicle can pull a heavier load than it can safely carry. This fact is put to use in motor transportation by employing trailers which have no motive power of their own but which are towed by a motor vehicle. Motor vehicles especially designed for towing trailers are known as tractors. In one combination of trailer and tractor, the trailer is provided with only two rear wheels and is supported at its front end on the tractor. This type of equipment is known as a semi-trailer.

The support on a tractor for a semi-trailer is obtained by providing a heavy plate at the bottom forward end of the trailer and a heavy plate at the top rear end of the tractor. These plates are known as "fifth wheels." A kingpin on the fifth wheel in the trailer is adapted to fit in a socket in the fifth wheel on the tractor for engagement between the trailer and the tractor and for pivotal movement of the trailer relative to the tractor. The cargo in the trailer can then be hauled by the tractor between a pair of terminals.

At larger terminals and warehouses, lift trucks or other mechanical means for handling freight are usually available; but such equipment may not be available at all places to which delivery is made. It is expensive to provide extra equipment merely for this service. Indeed, sometimes the cargo cannot be unloaded without some mechanical equipment. In any event, a lift truck saves much labor and turnaround time since vehicles can be unloaded faster and the freight carried or stacked as desired much quicker and more easily. Hence the need on the tractor or truck for auxiliary means to unload and handle the cargo.

Various attempts have been made to adapt the tractor for use as a lift truck for loading and unloading cargo from the trailer. Such attempts have not been completely successful for several reasons. For example, in such attempts, additional components have been used which have had to be attached to the tractor every time that it was desired to use the tractor as a lift truck. Similarly, the components have had to be detached after the use of the tractor as a lift truck in order for the tractor to be restored to its normal function of pulling the semi-trailer. The inconvenience and expense in labor of assembling and disassembling the components on the tractor at different times has largely cancelled any advantage which might have been obtained in increasing the adaptability of the tractor for various uses.

An object of this invention is to provide apparatus for use on a tractor or other automotive vehicle to adapt the tractor for utilization as a lift truck during times that the tractor is not pulling a semi-trailer.

Another object is to provide cargo lifting apparatus of the above character which can be conveniently carried by the tractor even while the tractor is pulling a semi-trailer and without any impairment in the efficient operation of the tractor as a vehicle for pulling the semi-trailer.

A further object is to provide cargo lifting apparatus of the above character which can be stored under normal load bearing members, such as the fifth wheel of the tractor, or the bed or body of a conventional truck, while not in use and which can be easily shifted into operating position when it is desired to convert the tractor into a lift truck.

Still another object is to provide apparatus of the above character so disposed relative to the normal frame members of the tractor body that none of the normal load bearing members on and above the body frame has to be removed or otherwise disturbed at any time and even during the time that the apparatus is being shifted in position to convert the tractor into a lift truck.

A still further object is to provide cargo lifting apparatus of the above character which is relatively simple, compact and inexpensive so that it can easily repay for itself in a relatively short time by combining the functions formerly performed by two relatively expensive pieces of equipment.

Other objects and advantages will be apparent from a detailed description of the invention and from the appended drawings and claims.

This invention provides apparatus which is used in conjunction with a tractor to convert the tractor into a lift truck when the tractor is not being used to pull a semi-trailer. The apparatus is adapted to be supported by the tractor under the usual load bearing members, such as the fifth wheel of the tractor or other similar members on the tractor body frame. Because of this, the apparatus is not in the way of nor interferes with the normal location or use of the fifth wheel on the tractor during the time that this fifth wheel is being coupled to the fifth wheel on the semi-trailer and during the time that the trailer is actually being pulled by the tractor. When it is desired to convert the tractor into a lift truck, the apparatus constituting this invention is easily moved into position to produce the conversion without any necessity of disturbing the fifth wheel or any other member on the tractor.

The apparatus constituting this invention includes an elevator frame slidably and pivotally mounted on and between the frame members of the tractor under the fifth wheel. Hydraulic or pneumatic motors are included to move the fork frame along the tractor frame in a direction away from the cab on the tractor when it is desired to convert the tractor into a lift truck, or in the reverse direction to return the parts to carrying position. Second hydraulic or pneumatic motors are also included and are coupled to the elevator frame. These motors drive the elevator frame in a pivotable direction relative to the tractor frame after the elevator frame has moved for a sufficient distance along the tractor frame to clear the members on the tractor impeding any pivotable movement. A fork lift is slidable on the elevator frame and is adapted to be moved by components such as a third set of hydraulic or pneumatic motors. The fork lift carries detachable forks or other cargo engaging means to enable it to load or unload cargo from the semi-trailer associated with the tractor or from any other suitable equipment or installation.

In the drawings:

Figure 1 is a top plan view, partly broken away to show certain components more clearly, of a tractor body and of apparatus which forms one embodiment of the invention and which is associated with the tractor to convert the tractor into a lift truck, the apparatus being shown in the carrying position when it is not being used;

Figure 2 is a side elevational view of the tractor body and the associated apparatus shown in Figure 1, some of the components being shown in full lines in carrying position and in broken lines in their operative position for converting the tractor into a lift truck;

Figure 3 is a sectional view substantially on the line 3—3 of Figure 2 and illustrates certain components in further detail;

Figure 4 is a perspective view of the tractor and the associated apparatus shown in the previous figures as seen from a position to the rear and to one side of the tractor and illustrates the disposition of the associated apparatus when the apparatus is not being used;

Figure 5 is a schematic view illustrating the relative disposition of certain components forming a part of the tractor and the associated apparatus shown in the previous figures when the associated apparatus is being carried and not in use;

Figure 6 is a schematic view of the components shown in Figure 5 and illustrates the relative disposition of the components when the apparatus associated with the tractor has been moved into an intermediate position in the series of movements required to convert the tractor into a lift truck;

Figure 7 schematically illustrates the relative disposition of the components shown in Figures 5 and 6 when the apparatus associated with the tractor has been moved to its final position to convert the tractor into a lift truck, the fork frame being shown in broken lines to illustrate an alternate position of these components;

Figure 8 is a perspective view of the apparatus shown in the previous figures and forming one embodiment of the invention but removed from the tractor as it appears when the apparatus is in its operative position to convert the tractor into a lift truck;

Figure 9 is a fragmentary, side elevational view of a tractor body and of apparatus associated with the tractor to form another embodiment of the invention, certain of the components being broken away to show other components more clearly;

Figure 10 is an enlarged fragmentary sectional view substantially on the line 10—10 of Figure 9;

Figure 11 is a schematic view similar to Figure 5 and illustrates the relative disposition of certain components forming a part of the tractor and the associated apparatus shown in Figures 9 and 10 when the associated apparatus is not in use;

Figure 12 is a schematic view similar to Figure 6 and illustrates the relative disposition of the components shown in Figure 11 when the apparatus associated with the tractor has been moved into an intermediate position to convert the tractor into a lift truck;

Figure 13 is a somewhat schematic view similar to Figure 7 and illustrates the relative disposition of the components shown in Figures 11 and 12 when the apparatus associated with the tractor is in its final operative position, certain of the components being shown in broken lines to illustrate an alternate position of these components; and Figure 14 is a fragmentary side elevational view of a tractor frame and of apparatus associated with the tractor and forming another embodiment of the invention, with the associated apparatus shown in its operative position to connect the tractor into a lift truck.

In the embodiment of the invention illustrated in Figures 1 to 8, inclusive, a tractor generally indicated at 10 has a cab 12 (Figure 4) and a body frame generally indicated at 16 extending rearwardly from the cab. The tractor body frame includes a pair of horizontally extending, laterally spaced side members 18 extending rearwardly from the cab 12. Each of the side members 18 may be of conventional channel shape with a vertical web portion 20 (Figure 3) and a pair of legs 22 extending horizontally inwardly of the frame from the vertical web portion at the top and bottom thereof.

A first cross member 24 (Figures 1 and 4) extends transversely between the side members at a position adjacent the cab to impart stiffness and strength to the frame 16. At positions adjacent the side members 18, the cross member 24 is forked as at 26 to enhance the strengthening action of the cross member. A second cross member 28 (Figures 2 and 4) extends transversely between the side members 18 at a position above, and near the rear end of, the side members. The cross member 28 is secured by gussets 30 to the side members 18 to impart additional strength to the corners of the tractor frame. Other cross members similar to cross member 28 may be added if desired.

A bedplate 32 (Figures 2, 3 and 4) is supported on the upper surfaces of the side members 18 at an intermediate position along the length of the side members. Reinforcing bars 34 may be disposed on the bedplate 32 at spaced intervals longitudinally along the bedplate. These bars 34 extend laterally across the full width of the tractor frame and help to support a pair of brackets 36 on the bed plate. A rocker pin 38 is journalled in the brackets 36 and is adapted to support a fifth wheel 40 in pivotable relationship to the brackets.

The fifth wheel 40 has a socket 42 for receiving a kingpin (not shown) on the fifth wheel hereinafter called "the upper fifth wheel" of a semi-trailer (not shown). The fifth wheel 40 has a substantially semi-annular support portion 46 (Figure 1), the upper surface of which is provided with a smooth configuration to facilitate a swinging movement between it and the fifth wheel on the semi-trailer as the tractor 10 pulls the semi-trailer. The fifth wheel also has a pair of integral ramps 48 which extend rearwardly from the support portion 46 in progressively increasing separation relative to each other. As will be disclosed in detail hereinafter, the ramps 48 guide the movement of the upper fifth wheel as the upper fifth wheel is moved into position for the kingpin to fit into the socket 42.

The pivotal movement of the fifth wheel 40 in a clockwise direction as seen in Figure 2 is limited by a brace 50 (Figures 1 and 2) which extend upwardly from the frame side members 18 and is substantially parallel to the cross member 24. The brace 50 supports one end of a skid 52 having a relatively smooth upper surface to guide the movement of the upper fifth wheel towards the ramps 48 when the semi-trailer (not shown) is being coupled to the tractor 10. The skid 52 is also supported at an intermediate position by a brace 54 (Figure 2). The brace 54 has a height somewhat smaller than that of the brace 50 to provide the skid 52 with a relatively flat inclination for facilitating the movement of the upper fifth wheel along the skid. At its rear end, the skid 52 is secured to the cross member 28.

A U-shaped coupling generally indicated at 58 (Figures 1 and 8) is slidably mounted in the side members 18 of the tractor frame 16. The coupling 58 includes a pair of parallel side members 60 (Figures 3, 4 and 8) slidable in the channel shaped guideway formed by the vertical web 20 and the horizontal legs 22 of the tractor side members 18. Each of the side members 60 has a substantially U-shaped or channel configuration in vertical cross-section as seen in Figure 3. Friction pads as at 65 may be disposed between the coupling members 60 and the side members 18 of the body frame to minimize friction when the coupling members 60 move relative to the side members 18. The coupling 58 also includes cross member 66 extending between the side members 60 at the front end of the side members of the coupling to maintain the side members 60 in rigid positioning relative to each other. Coupling 58 is thus supported by and between the side members of the tractor frame and does not extend above or below the tractor frame to interfere with the sliding movement.

A pivot pin 72 (Figures 1 and 2) extends through a pair of spaced brackets 74 disposed on the front surface of coupling 58. A tongue 76 of a motor means generally indicated at 80 is supported by the pin 72 between the brackets 74. In like manner, a pivot pin 82 (Figure 1) extends through a pair of spaced brackets 84 disposed on the rear surface of the cross member 24 at central position along the cross member. The pivot pin 82 connects to a tongue 86 on the prime mover 80.

The motor means 80 may be mechanical, pneumatic, hydraulic, electrical or of any other general form. For purposes of illustration but at least in part by preference, the motor 80 is shown and described as being a double-acting hydraulic cylinder. It includes an outer cylinder 88 which carries the tongue 86 at one end and which communicates with a fluid conduit 90 adapted to introduce fluid into the cylinder or exhaust fluid from the cylinder at one end. Sleeve 92 provides a second cylinder slidable within the outer cylinder 88 to which is connected conduit 94 for controlling the flow of fluid to vary the positioning of the sleeve 92 relative to the cylinder 88. A piston 96 is slidable within sleeve 92. The interior of the sleeve is in communication with a conduit 98 connected to the rear end of the sleeve to control the positioning of the piston relative to the cylinder. The telescoping cylinder arrangement is employed to secure a greater range of movement.

Conduits 90, 94 and 98 are part of a hydraulic control and operating system of any suitable type. Since such systems are well known, the system is not shown or described herein; but it will be understood that the conduits are connected in closed circuit to some source of hydraulic fluid under pressure, as a gear pump. The system also includes suitable valves of any desired type to control fluid flow in the conduits. The same applies to the conduits connected to the other motor means described later.

First and second pairs of spaced brackets 100 (Figures 1 and 2) extend outwardly from the surface of the coupling cross member 66 near opposite ends of the cross member. Each pair of brackets 100 in turn supports a pin which connects to a tongue 104 extending from a motor means generally indicated at 106. Although each of the two motors 106 may be mechanical, electrical, pneumatic or any other suitable type, they are shown and described as being hydraulic, partly for illustration but at least in part by preference. In its hydraulic embodiment, each prime mover 106 includes a cylinder 108 containing a piston 110 and a pair of conduits 112 and 114 at opposite ends of the cylinder for controlling the flow of fluid into and out of the cylinder and the resultant positioning of the piston relative to the cylinder. The cylinders 108 and the pistons 110 extend downwardly at a slight inclination relative to the side members 18.

The pistons 110 are each pivotally connected to one end of a linkage member 116. The other end of each linkage member 116 is attached to the bottom surfaces of side members 118 (Figures 1, 3 and 8) forming a part of a rectangular elevator frame generally indicated at 120 (Figures 1 and 8). Pivot pins 122 (Figure 3) extend outwardly from the side members 118 into journal bearings 124 for pivotal movement of the pins and the elevator frame relative to the bearing. The bearings 124 are suitably secured one to each of the side members 60 of the coupling 58.

The side members 118 of the elevator are preferably made of structural channels, as are the side members 60 of the coupling. Each of the side members 118 has a pair of guides 132 which extend inwardly from opposed faces of side members 118.

A cross member 134 extends between the side members 118 at their rear or top end while another cross member 138 extends between them at their front or lower end. The cross members rigidly interconnect the side members to provide a rectangular frame pivotally mounted to swing about a horizontal axis established by pivot pins 122. This axis is transverse to the length of tractor body members 18 and intersects them.

An elevator or fork lift generally indicated at 140 (Figures 1 and 8) is movably positioned relative to the side members 118 of the elevator frame 120 to be engaged and guided by guides 132. The fork lift 140 includes an apron 142 slidable between pairs of guide portions 132. The apron may be a flat plate having a pair of beams 146 extending horizontally across the flat plate near the top and bottom, as seen in Figure 8.

As typical of cargo engaging means, but without limitation thereto, a pair of forks 148 (Figure 8) are suitably attached, as by bolts, to the cross beams 146 at spaced positions along the length of the cross beams. Each of the forks 148 has a backing portion extending upwardly between the cross beams 146 and a horizontal leg portion 150 extending outwardly from the cross beams 146 and the apron 142. Cargo (not shown) is adapted to rest on or be otherwise engaged by fork legs 150 for lifting or lowering by the fork lift 140.

The lift 140 is adapted to be driven by mechanical, hydraulic, pneumatic or other suitable types of apparatus. By way of illustration but partly by way of preference, the driving apparatus is shown as being hydraulic. It includes a pair of cylinders 152 (Figure 3) and an associated pair of pistons 154 movable within and relative to the cylinders. Cables or ropes 156 extend from the pistons 154 over pulleys 158 rotatably supported, as by shaft 160, from the side members 118. The cables 156 are attached at their other ends to the apron 142.

Ordinarily, the tractor 10 is used to pull a semi-trailer (not shown) loaded with cargo. In order to load the cargo on the semi-trailer or to unload the cargo from the semi-trailer, the tractor is converted into a lift truck. As a first step in accomplishing this, the conduit 90 is opened to transmit fluid under pressure to the hydraulic motor 80 and the conduits 94 and 98 are open to exhaust from the motor. This flow of fluid drives the sleeve 92 and piston 96 in a direction away from the cab 10 or to the right in Figure 1. The piston 96 initially follows the movement of the sleeve 92 until it reaches the end of cylinder 88 after which the sleeve stops and piston 96 continues on to the right to slide coupling 58, the elevator frame 120 and the fork lift 140 to the right in Figure 1.

Alternatively, conduit 98 may be closed to fluid flow until the sleeve 92 has been driven to a position where its left end as seen in Figure 1 contacts the right end of the cylinder 88, when conduit 98 is opened. This causes fluid entering the motor from conduit 90 to drive piston 96 to the right relative to the sleeve 92 until the piston abuts the end surface of the sleeve.

Although it has been disclosed above how the sleeve 92 is first moved relative to the cylinder 88 and the piston is subsequently moved relative to the sleeve 92, it should be appreciated that this order can be reversed. In either sequence, the coupling 58, the elevator frame 120 and the fork lift 140 are moved through a distance substantially twice as great as the effective length of the piston 96 travel in sleeve 92. By this arrangement, the space occupied by the cylinder 88, the sleeve 92 and the piston 96, when contracted can be minimized for a given range of travel.

When the coupling 58, the elevator frame 120 and the fork lift 140 have been moved sufficiently to the right, the elevator frame 120 becomes free to pivot through an angle of about 90° relative to the coupling 58 without any interference from the tractor frame 16. Pivotal movement of the elevator frame 120 is effectuated by opening the conduits 112 (Figure 2) for transmission of hydraulic fluid under pressure to each of the cylinders 108, fluid being at the same time exhausted by way of conduits 114. This flow of fluid causes the pistons 110 to be driven downwardly and to the right in Figure 2. The movement of the pistons 110 in turn cause the linkage members 116 to be driven in a direction to produce a pivotal movement of the elevator frame about pins 122 (Figures 2 and 3) in a counterclockwise direction relative to the tractor frame.

The elevator frame pivots in a counterclockwise direction from a horizontal carrying position in Figure 5 to an approximately vertical operative position as indicated by full lines at 170 in Figure 7. The outer or rear end of the elevator frame swings upwardly to become the top end when in operative position while the inner or front end of the frame swings downwardly away from the tractor frame to a position approximately at ground level. The fork frame 120 may either stop after swinging through an angle of substantially 90° to the vertical position 170 or it may pivot through an angle slightly greater than 90° to a slightly inclined position. The slightly inclined position of the fork frame 120 is indicated by broken lines at 172 in Figure 7 and is advantageous for reasons which will be disclosed in detail hereinafter.

After the fork frame 120 has been pivoted into its upright position as shown in Figure 7, the forks 148 (Figure 8) are attached to the cross beams 146 so that cargo may be engaged by the support portions 150 of the forks. The cargo is then lifted by effectuating an upward movement of the fork lift and the attached forks, in turn caused by movement of pistons 154 into the hydraulic cylinders 152. As the pistons 154 move down into the cylinders 152, they pull on cables 156 passing over pulleys 158 and the cables 156 then lift the fork lift 140, forks 148 and the cargo on the forks. The cargo may be lifted to load it into a semi-trailer or it may be lifted to the platform of a warehouse for storage in the warehouse or it may be lifted to any other suitable place. Stability in the positioning of the cargo on the forks 148 may be materially increased by tilting the elevator frame 120 from a truly vertical positioning to the position shown in broken lines at 162 in Figure 7. In such a positioning, a component of gravitational force exists to maintain the cargo against the backs of the forks 148.

When the tractor 10 has completed its functions as a lift truck, the apparatus constituting this invention is returned to its position under the fifth wheel. As a first step, the forks 148 are detached and removed from the cross beams 146. They are stored in a convenient place on the tractor 10. The pistons 154 (Figure 8) are then operated by reversing the direction of fluid flow to move the apron 142 to the bottom of the guide portions 132 (Figure 3) in the side members 118. The pistons 110 are subsequently driven by fluid pressure into the cylinders 108 to produce a pivotal movement of the elevator frame 120 in a clockwise direction as seen in Figure 2. The pivotal movement of the elevator frame 120 is maintained until the side members 118 in the elevator frame become substantially aligned with the side members 60 in the coupling 58, as in Figure 6. As a final step, movements of the piston 96 into the sleeve 92 and of the sleeve 92 into the cylinder 88 are effectuated by admitting fluid under pressure through conduits 94 and 98, either simultaneously or in a desired sequence while exhausting fluid through conduit 90. This operation of the fluid motor slides the coupling and elevator frame into the carrying position of Figure 5 between body frame members 18.

Upon the return of the coupling 58, the elevator frame 120 and the fork lift 140 to their proper position under the fifth wheel 40, the tractor 10 is ready to receive the semi-trailer (not shown). This is effectuated by moving the fifth wheel on the semi-trailer (the "upper fifth wheel") forwardly along the skid 52 (Figures 1 and 2).

As the upper fifth wheel moves forwardly along the skid, it also moves upwardly because of the inclined disposition of the skid. After the upper fifth wheel has cleared the skid, it moves forwardly along the ramps 48 (Figure 1). During the movement of the upper fifth wheel along the ramps 48, the ramps act to properly position the upper fifth wheel in a lateral direction relative to the fifth wheel 40. This is accomplished by maintaining the kingpin (not shown) on the upper fifth wheel between the ramps 48, which converge in the direction of forward movement of the kingpin.

The semi-trailer is finally attached to the tractor 10 by inserting the kingpin in the socket 42. Since the fifth wheel 40 and the upper fifth wheel have smooth surfaces in load bearing contact with each other, the fifth wheels are able to pivot relative to each other as the tractor 10 pulls the semi-trailer. In this way, the semi-trailer and tractor can change alignment as is required when pulling the semi-trailer around sharp curves. The proper positioning between the tractor 10 and the semi-trailer is also facilitated because of the pivotal positioning of the rocker pin 38 and the fifth wheel 40. This pivotal movement is especially important when the tractor and semi-trailer hit bumps in the road or pass over vertical curves.

Figures 9 and 13 disclose a second embodiment of the invention which is similar to the embodiment already described as far as the general construction and arrangement of parts is concerned. The chief difference is in the manner in which the elevator frame swings from the carrying position to the upright operative position. In this form of apparatus, the inner or front end of the elevator frame swings upwardly to become the top end when the frame is upright while the rear or outer end of the frame swings downwardly to a position approximately at ground level. Obviously, certain changes in the arrangement of the various parts are required to obtain this new direction of pivotal movement, but otherwise the construction is similar to that already described.

In the embodiment shown in Figures 9 to 13, inclusive, a tractor body frame generally indicated at 200 is provided. The frame 200 includes a pair of channel-shaped side members 202 (Figures 9 and 10) each having a vertical web 204 and a pair of legs 206 which extend inwardly from the web 204. As in the embodiment shown in Figures 1 to 8, inclusive, the tractor frame is strengthened and stiffened by cross members which extend between and are connected to the side members 202. For example, in the fragmentary views shown in Figures 9 and 10, cross bars 208 and 210 are shown as extending between the side members 202 at the bottom of the side members.

Bed plate 214 (Figure 9) extends across the frame and is fastened to the tops of the side members 202 at an intermediate position along the lengths of the side members. A pair of reinforcing bars 216 extend laterally between the side frame members to strengthen the bedplate. A pair of brackets 218 are supported on the bedplate 214 and are disposed directly over the side frame members 202. A rocker pin 220 is journalled in the brackets 218 to pivot relative to the brackets, and a fifth wheel 222 is supported as by arms 224 on the rocker pin 220. The fifth wheel 224 may correspond substantially in construction to the fifth wheel 40 in the embodiment shown in Figures 1 to 8, inclusive, and disclosed above.

A coupling generally indicated at 228 includes a pair of side members 230 slidable along the side members 202 of the tractor frame 200. The coupling side members 230 are moved in a longitudinal direction along the tractor frame 200 by motor means similar to that shown in Figure 1 and disclosed above. Such motor means includes cylinders 232 (Figures 11, 12 and 13) and pistons 234, when the coupling 228 is to be hydraulically driven, constructed and connected as described above in conjunction with motor means 80.

Second motor means are pivoted at one end as at 236 (Figure 9) to the side members 230 in the coupling 228. The second motors include cylinders 238 and pistons 240 when the prime movers operate hydraulically. The cylinders 238 and pistons 240 are disposed in a longitudinal direction and with a relatively flat upward inclination for reasons which will be disclosed in detail hereinafter. At their forward end, the pistons 240 pivotably engage linkage members 242 which extend forwardly and downwardly from the pistons.

The forward ends of the linkage members 242 are attached to the top surfaces of side members 244 (Figure 10) included in an elevator frame generally indicated at 246. Pivot pins 248 extend outwardly from the outer faces of the side members 244 of the elevator frame. The pins 248 are positioned within journal bearings 252 extending laterally inwardly from the inner faces of the side members 230 of the coupling.

Each side member 244 has mounted on it a pair of guides 256 which extend laterally inwardly from the opposed faces of the two side members of the elevator frame. Guides 256 of each pair are in spaced relationship to each other.

An apron 260 (Figure 9) is disposed to slide between the guides 256 of the side members 244. The apron forms part of a fork lift generally indicated at 262. Braces 264 are supported on the apron 260 and a skid 266 is supported on the upper ends of the braces 264. The skid 266 corresponds to the skid 52 shown in Figures 1 and 2 and disclosed above but performs additional functions, as will be disclosed hereinafter. Forks 268 (Figure 13) corresponding to the forks 148 shown in Figure 8 are suitably mounted in any easily detachable manner on the skid 266 to provide a support for cargo to be lifted by the tractor.

From the retracted or carrying position of Figures 9 and 11, the coupling 228, the elevator frame 246 and the fork lift 262 are moved longitudinally along the side members 202 to the position of Figure 12 by causing a movement of the pistons 234 relative to the cylinders 232. When the forward end of the elevator frame 246 has cleared the rear end of the fifth wheel 222, the elevator frame is free to pivot relative to the coupling 228. The elevator frame 246 is pivoted relative to coupling 228 by a rearward movement of the pistons 240 to the right in Figure 9, relative to the cylinders 238. A rearward movement of the pistons 240 causes the linkage members 242 to be driven in a direction to produce a pivotal movement of the elevator frame in a clockwise direction about a horizontal axis established by pins 248 with the bearings 252, as seen in Figure 13.

The pivotal movement causes the inner or forward portion of the fork frame 246 to the left of the pins in Figures 9 and 12 to move rearwardly and upwardly and the outer or rear portion of the fork frame 246 to the right of the pins in Figures 9 and 12 to move downwardly and forwardly to approximately the ground level. This rotational movement is opposite to that shown in Figure 7. The fork frame may move through substantially 90° to the position indicated in full lines at 270 in Figure 13, or it may move through an angle slightly less than 90° to a position indicated in broken lines at 272 in Figure 13. The inclined position 272 has certain advantages during the lifting and lowering of cargo, as disclosed above.

After the fork frame 248 has been pivoted into position, the forks 268 are attached to the skid 266 so that cargo (not shown) can be engaged by and supported on the forks. The apron 260, the skid 266 and the forks 268 are then moved vertically along the guides 256 of the side members 244 to obtain vertical movement of the cargo. The apron, shed, and forks are raised and lowered by suitable means such as the hydraulic motors and cables at 152—154 and 156 respectively in Figure 8 and described above. In this way, the cargo can be lifted by the tractor into a semi-trailer (not shown), to the platform of a warehouse or to any other suitable place.

Since the skid 266 moves with the apron 260 and supports the forks 268, it serves as a back stop to position cargo on the forks in addition to its normal function of guiding the fifth wheel on the semi-trailer into position on the lower fifth wheel 222 on the tractor.

In the embodiment shown in Figure 14, a tractor frame generally indicated at 300 has a pair of side members 302 that are longitudinally slotted as at 304. Stop 306 extends across the tractor frame between the side members 302 and also acts as a frame brace. The stop is positioned slightly in front of the rear ends of the slots 304. Side members 308 forming a part of an elevator frame generally indicated at 310 and constructed as described above, are slidable along the side members 302. They are guided in their movement by pivot pins 312 fastened to the elevator frame and movably disposed within the slots 304.

An arm 314 extends downwardly from each side member 308 at the forward end of the side members. A piston 316 is attached to an arm 314 on each of the two side members 308. The two pistons 316 each form a part of a motor means generally indicated at 318. The motor means includes cylinder 320 and sleeves 322 slidably disposed within the cylinder. The parts are indicated in broken lines in their operative position. The hydraulic motors 318 may correspond in construction and operation to the motors 80 shown in Figures 1 and 2 and fully described above. The front end of each cylinder 320 is pivotally attached to the tractor frame 300 so that the hydraulic motor can pivot in a downward direction.

The side members 308 on the elevator frame 310 are driven longitudinally of the frame and of the tractor frame to the right in Figure 14, by the movement of the pistons 316 relative to the sleeves 322 and similar movement of the sleeves relative to the cylinders 320. As the side members 308 move to the right, their movement is guided by the pins 312 in the slots 304. When the guide members 308 have moved through a sufficient distance for the pins 312 to engage the right hand ends of slots 304 in Figure 14, the elevator frame 310 is clear of any obstacles to swinging movement. If necessary to obtain such clearance, the bottom leg of the channel shaped side members 302 is terminated at 321 forwardly of the inner end of the elevator frame when not the end of its sliding movement. This frees the elevator frame 326 for pivotal movement in a counterclockwise direction about the axis of pins 312 relative to the tractor frame 300.

Pivotal movement of the fork frame 310 relative to the tractor frame 300 is caused by the disposition of the ears 314 below the pins 312. As the elevator frame 310 pivots to the position indicated in broken lines at 326, the motor means 318 pivots downwardly to the position indicated in broken lines in Figure 14. Pivotal movement of the elevator frame 310 is limited by the stop 306 so that the fork frame becomes disposed in optimum position for lifting or lowering cargo. Elevator frame 310 has mounted on it a lift and forks as described above, but omitted from Figure 14 to simplify the illustration.

The different embodiments of the apparatus disclosed above have several important advantages. They increase the scope of functions which can be performed by a truck or tractor providing for an easy conversion of the vehicle into a lift truck. The conversion is accomplished by moving the apparatus into operative position from its resting place under such normal load bearing components on the tractor as the fifth wheel. The movement of the apparatus into its operative position is accomplished without any requirement that the normal load bearing components on the tractor be removed or otherwise displaced. The apparatus is moved without the necessity of any physical exertion by the operator other than the operation of control buttons or switches.

When the apparatus is no longer required for use in converting the tractor into a lift truck, the apparatus is returned to its position under the normal components on the tractor such as the fifth wheel. The tractor is then ready for use in its normal function of pulling a semi-trailer or any other suitable type of cargo vehicle. During the use of the tractor in pulling the semi-trailer, the apparatus disclosed above and constituting this invention is retained under the fifth wheel or any of the other normal components in the tractor and is not damaged even when the tractor and trailer hit bumps or holes or any other obstructions.

In the above disclosure, the apparatus constituting this invention has been described primarily in conection with a tractor intended to pull a semi-trailer. It will be appreciated, however, without added description that the apparatus can be easily adapted for use in conjunction with other types of trucks or cargo vehicles. Likewise, other changes in the shape, arrangement, and construction of the various component parts may be made without departing from the scope and spirit of my invention. Accordingly, it is to be understood that the above description is considered to be illustrative of, rather than limitative upon, the appended claims.

I claim:

1. In a tractor having a body frame including a pair of horizontally extending, laterally spaced frame members, the combination comprising: an elevator frame; a coupling slidably mounted on and between said two body frame members to move longitudinally thereof and pivotally connected to said elevator frame for angular movement of said elevator frame about a horizontal axis relative to said coupling; a first motor means for producing a horizontal sliding movement of the coupling and elevator frame rearwardly relative to the tractor body frame to a position in which a portion of the elevator frame projects beyond the body frame members; a second motor means for producing pivotal movement of the elevator frame relative to the coupling after said sliding movement of the elevator frame; and fork means removably associated with the elevator frame for lifting objects.

2. In a tractor having a body frame including a pair of horizontally extending, laterally spaced frame members and a normal load bearing member attached to and extending between said pair of frame members in a fixed position relative to the frame members, the combination comprising: an elevator frame; means slidably and pivotally mounting the elevator frame on the tractor body frame beneath said normal member in a horizontal position at the level of the body frame members; motor means for producing a horizontal sliding movement of the elevator frame rearwardly relative to the tractor frame to a position in which the elevator frame is located rearwardly of the normal load bearing member; a second motor means for producing a pivotal movement of the elevator frame relative to the tractor body frame after said sliding movement of the elevator frame from under the load bearing member; and means associated with the elevator frame for lifting objects.

3. In a tractor having a cab and a frame and a load bearing fifth wheel rigidly attached to and supported on and above the frame, the combination comprising: an elevator frame supported on the tractor frame at a position beneath the load bearing fifth wheel and in slidable and pivotal relationship to the tractor frame; first motor means for driving the elevator frame along the tractor frame to produce a clearance of the fifth wheel by the elevator frame for a pivotal movement of the elevator frame relative to the tractor frame; a linkage pivotally connected at one end to the elevator frame for producing a pivotal movement of the elevator frame; second motor means for driving the other end of the linkage to produce a pivotal movement of the elevator frame; a fork lift removably and slidably supported on the elevator frame, and means for driving the fork lift to produce an elevation of objects supported on the fork lift.

4. In a tractor having a cab and a body frame including a pair of horizontally extending, laterally spaced frame members and a load bearing member rigidly supported on and above the body frame members; an elevator; means mounting the elevator on and between the tractor frame members at a position under the load bearing member for linear slidable movement guided by and relative to the tractor frame, said mounting means including a pivot pin connected to the elevator frame at an intermediate position along the length of the elevator frame to establish a horizontal axis at the level of the body frame members; motor means for producing a slidable movement of the elevator frame in a direction towards or away from the cab; second motor means for producing a pivotal movement of the elevator frame on the pivot pin to produce an upwardly swinging movement of one end of the frame and a downwardly swinging movement of the other end of the frame to a level approximating ground level; a fork lift slidable along the elevator frame after the pivotal movement of the frame, and means for varying the positioning of the fork lift in the elevator frame to vary the positioning of objects carried by the fork lift, said fork lift being removable from the elevator.

5. In a tractor having a body frame and a load bearing member supported on the body frame, the combination comprising: a coupling slidably supported on the tractor frame beneath the load bearing member; motor means for producing a horizontal sliding movement of the coupling along the tractor frame longitudinally thereof; an elevator frame pivotally mounted on the coupling for normal positioning beneath the load bearing member; means for providing a pivotal movement of the elevator frame on the coupling following sufficient movement of the coupling along the tractor frame for clearance by the elevator frame of the load bearing member; a fork lift slidably supported by the elevator frame; and means for producing a sliding movement of the fork lift along the elevator frame.

6. In a tractor having a body frame and a load bearing member supported on and above the frame, the combination comprising: a coupling slidably supported by the tractor frame beneath the load bearing member; means connected to the tractor frame and to the coupling for producing a sliding movement of the coupling along the tractor frame beneath the load bearing member; an elevator frame pivotally supported by the coupling for normal positioning beneath the load bearing member; means for producing pivotal movement of the elevator frame on the coupling after a clearance by the elevator frame of all parts of the tractor frame and the load bearing member; a fork lift slidably supported by the elevator frame for normal positioning beneath the load bearing member; means for producing a sliding movement of the fork lift along the elevator frame; and fork means detachably mounted on the fork lift to provide a support for objects being moved by the fork lift.

7. In a vehicle having a body frame including a pair of horizontally extending, laterally spaced channel members, and a fifth wheel rigidly mounted on and above the channel members, the combination comprising: an elevator frame; a coupling frame including a pair of spaced side members slidably mounted on and between the said pair of body channel members to move longitudinally thereof, the coupling frame being movable linearly to a rearward position in which a portion of the coupling frame projects rearwardly beyond and outside of the channel members; means pivotally connecting the elevator frame to the coupling frame to allow the elevator to swing about a horizontal axis passing through the coupling frame at the level of the channel members; a first motor means for producing said horizontal sliding movement of the coupling and elevator frames to said rearward position; a second motor means for producing swinging movement of the elevator frame about said axis relative to the coupling frame when in said rearward position; and fork means removably associated with the elevator frame for engaging and lifting objects from the ground level.

8. In a tractor having a body frame including a pair of horizontally extending, laterally spaced frame members and a normal load bearing member attached to and extending between said pair of frame members in a fixed position relative to the frame members, the combination comprising: an elevator frame; means slidably and pivotally mounting the elevator frame on the tractor body frame beneath said normal member in a horizontal position at the level of the body frame members; motor means for producing a horizontal sliding movement of the elevator frame rearwardly relative to the tractor frame to a position in which the elevator frame is located rearwardly of the normal load bearing member; a second motor means connected to the inner end of the elevator frame to swing said inner end downwardly to produce pivotal movement of the elevator frame relative to the tractor body frame after said sliding movement of the elevator frame from under the load bearing member; and means associated with the elevator frame for lifting objects.

9. In a tractor having a body frame including a pair of horizontally extending, laterally spaced frame members and a normal load bearing member attached to and extending between said pair of frame members in a fixed position relative to the frame members, the combination comprising: an elevator frame; means slidably and pivotally mounting the elevator frame on the tractor body frame beneath said normal member in a horizontal position at the level of the body frame members; motor means for producing a horizontal sliding movement of the elevator frame rearwardly relative to the tractor frame to a position in which the elevator frame is located rearwardly of the normal load bearing member; a second motor means connected to the inner end of the elevator frame to swing said inner end upwardly to produce pivotal movement of the elevator frame relative to the tractor body frame after said sliding movement of the elevator frame from under the load bearing member; and means associated with the elevator frame for lifting objects.

10. In a tractor having a body frame including a pair of horizontally extending laterally spaced frame members and a normal load bearing member attached to and extending between said pair of frame members in a fixed position relative to the frame members, the combination comprising: an elevator frame; means slidably and pivotally mounting the elevator frame on the tractor body frame beneath said load bearing member in a horizontal position at the level of the body frame members, said elevator frame being movable horizontally and rearwardly relative to the tractor frame to a rearward position in which the elevator frame is located rearwardly of said load bearing member; motor means for producing pivotal movement of the elevator frame relative to the tractor body when the elevator frame is in said rearward position to swing the elevator frame to an upwardly extending position; and fork means movably associated with the elevator frame for lifting objects from the ground.

References Cited in the file of this patent

UNITED STATES PATENTS

| | | |
|---|---|---|
| 878,751 | Schreiber | Feb. 11, 1908 |
| 2,542,425 | Oliver | Feb. 20, 1951 |
| 2,659,501 | Pelaez | Nov. 17, 1953 |